(12) United States Patent
Chalin et al.

(10) Patent No.: US 7,914,026 B2
(45) Date of Patent: Mar. 29, 2011

(54) SUSPENSION SYSTEM HAVING A COMPOSITE BEAM

(75) Inventors: Thomas N. Chalin, Fairview, TX (US);
Cully B. Dodd, McKinney, TX (US);
Herbert D. Hudson, McKinney, TX (US)

(73) Assignee: Watson & Chain Manufacturing, Inc., McKinney, TX (US)

( * ) Notice: Subject to any disclaimer, the term of this patent is extended or adjusted under 35 U.S.C. 154(b) by 1203 days.

(21) Appl. No.: 10/600,051

(22) Filed: Jun. 20, 2003

(65) Prior Publication Data

US 2004/0256829 A1    Dec. 23, 2004

(51) Int. Cl.
*B60G 9/00* (2006.01)
(52) U.S. Cl. .................................. 280/124.116
(58) Field of Classification Search ........... 280/124.116, 280/124.11, 124.128
See application file for complete search history.

(56) References Cited

U.S. PATENT DOCUMENTS

| | | | | |
|---|---|---|---|---|
| 3,756,646 A | * | 9/1973 | Gimlett et al. .................. 295/43 |
| 4,858,949 A | * | 8/1989 | Wallace et al. ........ 280/124.116 |
| 5,741,027 A | * | 4/1998 | Stroh et al. ..................... 280/781 |
| 5,788,263 A | * | 8/1998 | VanDenberg .......... 280/124.116 |
| 5,988,672 A | * | 11/1999 | VanDenberg ................. 280/683 |
| 6,491,314 B2 | * | 12/2002 | Smith et al. ............ 280/124.116 |
| 6,508,393 B2 | | 1/2003 | Chalin |
| 6,543,857 B1 | * | 4/2003 | Griffiths et al. ............... 301/127 |
| 6,805,369 B2 | * | 10/2004 | Galazin ................. 280/124.116 |
| 6,843,490 B2 | * | 1/2005 | Raidel et al. ........... 280/124.116 |
| 6,893,733 B2 | * | 5/2005 | Obeshaw ..................... 428/593 |
| 2005/0051986 A1 | * | 3/2005 | Galazin et al. ......... 280/124.116 |

OTHER PUBLICATIONS

American Society for Testing and Materials Standard D-3878-02a, Dated Feb. 2003.

* cited by examiner

*Primary Examiner* — Faye M. Fleming
(74) *Attorney, Agent, or Firm* — Smith IP Services, P.C.

(57) ABSTRACT

A suspension system having a composite beam. In a described embodiment, a suspension system for a vehicle having a frame is provided. The suspension system includes an axle and a beam interconnected between the vehicle frame and the axle. The beam has opposite ends, an elongated body extending between the opposite ends, and a metal end connection at one of the opposite ends. The body is made of a composite material.

49 Claims, 6 Drawing Sheets

SUSPENSION SYSTEM HAVING A COMPOSITE BEAM

BACKGROUND

The present invention relates generally to vehicle suspension systems and, in an embodiment described herein, more particularly provides a suspension system having a composite beam.

It is increasingly important for truck and trailer suspension systems to be made lighter and have increased load-carrying capacities. This is due, in part, to increased fuel costs and other costs of transporting goods by wheeled vehicles. By making the vehicle lighter, less fuel is consumed. By increasing the load-carrying capacity, more cargo may be transported by an individual vehicle.

It is known to fabricate suspension system components out of laminated material to decrease the weight of the components. However, prior methods of constructing these components are seen to be unsatisfactory, since they are very time-consuming and labor-intensive. One example is described in U.S. Pat. No. 5,788,263 (the entire disclosure of which is incorporated herein by this reference).

From the foregoing, it can be seen that it would be quite desirable to provide improved methods of constructing suspension systems having reduced weight and increased load-carrying capacities.

SUMMARY

In carrying out the principles of the present invention, in accordance with an embodiment thereof, a suspension system is provided which utilizes a beam including a body made of a composite material. One or more end connections at opposite ends of the beam may be made of metal for attaching the beam to other elements of the suspension system.

In one aspect of the invention, a suspension system for a vehicle having a frame is provided. The suspension system includes an axle and a beam interconnected between the vehicle frame and the axle. The beam has opposite ends, an elongated body extending between the opposite ends, and a metal end connection at one of the opposite ends. The body is made of a composite material.

In another aspect of the invention, a suspension system is provided which also includes an axle and a beam interconnected between a vehicle frame and the axle. The beam has opposite ends, an elongated body extending between the opposite ends, an axle end connection at one of the opposite ends, and a frame end connection at the other of the opposite ends. The body is made of a composite material and has a cross-section with at least two flanges and a web extending between the flanges.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
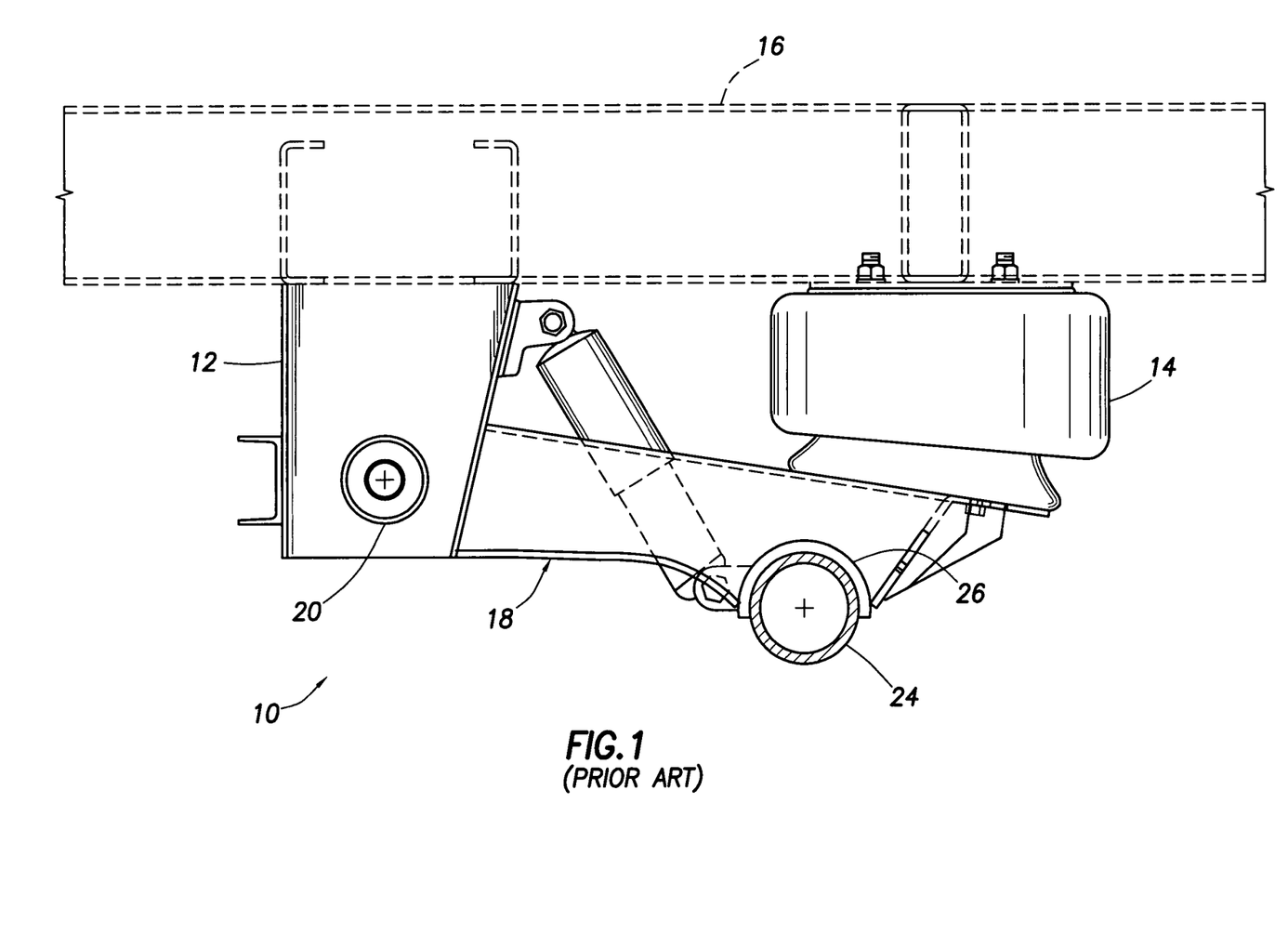
FIG. 1 is a side elevational view of a prior art suspension system.

Illustrated in FIG. 1 is a prior art suspension system 10 of the type described in U.S. Pat. No. 6,508,393, the entire disclosure of which is incorporated herein by this reference. The suspension system 10 is described below for the purpose of demonstrating how the principles of the invention may be used in known types of suspension systems. However, it should be clearly understood that the principles of the invention may be used in any type of suspension system, for example, pusher-type suspension systems, trailing arm suspension systems, lift axle suspension systems, parallelogram and modified parallelogram suspension systems, spring beam suspension systems, etc.

As depicted in FIG. 1, the suspension system 10 includes a hanger bracket 12 extending downwardly from a frame 16 of a vehicle. An air spring 14 is connected between the frame 16 and a rear end of an arm or beam 18. A forward end of the beam 18 is pivotably connected to the hanger bracket 12 using a pivot bushing 20. An axle 24 is attached to the beam 18 by means of an axle seat 26 of the beam.

Another prior art suspension system is described in U.S. patent application Ser. No. 10/061,774, filed Feb. 1, 2002, the entire disclosure of which is incorporated herein by this reference.

Figure 2:
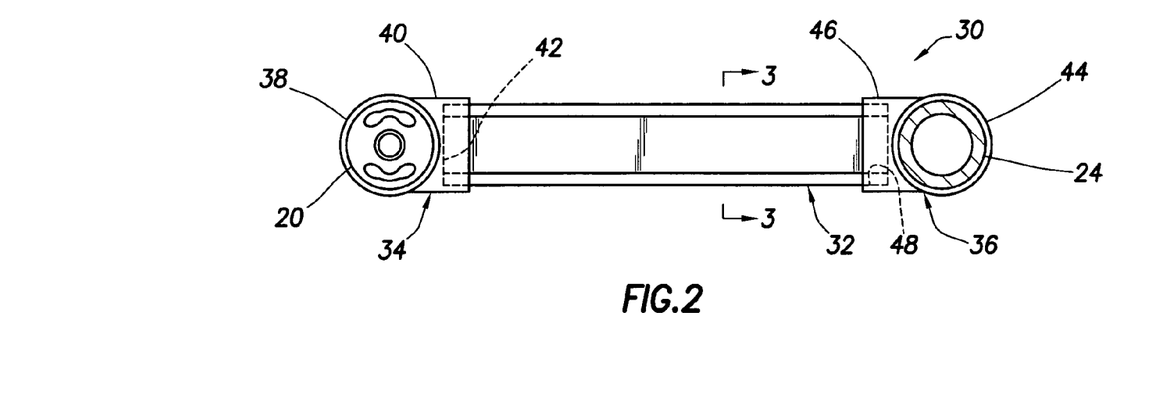
FIG. 2 is a side elevational view of a beam embodying principles of the invention.

Representatively illustrated in FIG. 2 is a beam 30 which embodies principles of the present invention. In the following description of the beam 30 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

The beam 30 may be used in the suspension system 10 in place of the beam 18, if desired. The beam 30 may also be used in other suspension systems, including those types listed above, and others. Other beams described below may also be used in the suspension system 10, or in other suspension systems.

The beam 30 includes a body 32 and end connections 34, 36 at opposite ends of the body. In one unique aspect of the invention, the body 32 is preferably made of a composite material, and each of the end connections 34, 36 is preferably made of metal. The body 32 being made of a composite material is relatively strong and light weight, and the end connections 34, 36 facilitate connection of the composite body to the frame 16 and to the axle 24, respectively.

As used herein, the term "composite material" is used to indicate a material consisting of two or more constituents, insoluble in one another, which are combined to form the material possessing certain properties not possessed by the individual constituents. Examples of composite materials include glass or carbon fibers in a resin matrix, etc. Composite materials may include laminations, for example, laminations in a molded or pultruded composite material.

The end connection 34 includes a frame coupling structure 38 and a body coupling structure 40. The structures 38, 40 may be integrally formed from a single piece of material, or the structures may be separately formed and then attached to each other, for example, by welding. The frame coupling structure 38 is depicted as a sleeve which receives the pivot bushing 20 therein.

The body coupling structure 40 has a cavity 42 formed therein for internally receiving the body 32 therein. Preferably, the cavity 42 is complementarily shaped relative to the body 32. The body 32 may be attached to the structure 40 by any of a variety of methods, such as by adhesively bonding, using fasteners, etc.

The end connection 36 includes an axle coupling structure 44 and another body coupling structure 46. The structures 44, 46 may be integrally formed from a single piece of material, or the structures may be separately formed and then attached to each other, for example, by welding.

The axle coupling structure 44 is depicted as a sleeve which receives the axle 24 therein. The sleeve 44 as depicted in FIG. 2 extends completely about the axle 24, but it should be understood that it is not necessary for the sleeve to completely encircle the axle. The sleeve 44 may be welded to the axle 24, or otherwise rigidly attached thereto, such as by using a clamp, etc.

If the beam 30 is used in a parallelogram-type suspension system, the axle coupling structure 44 is preferably not rigidly attached to the axle 24. Instead, the structure 44 is pivotably attached to the axle 24, for example, by using a pivot bushing such as the bushing 20. In that case, the structure 44 would preferably be similar to the structure 38, in that it would be pivotably attached to the axle 24 in a manner similar to the pivoting attachment of the structure 38 to the frame 16 (via the hanger bracket 12).

The body coupling structure 46 has a cavity 48 formed therein for internally receiving the body 32 therein. Preferably, the cavity 48 is complementarily shaped relative to the body 32. The body 32 may be attached to the structure 46 by any of a variety of methods, such as by adhesively bonding, using fasteners, etc.

Figure 3A:
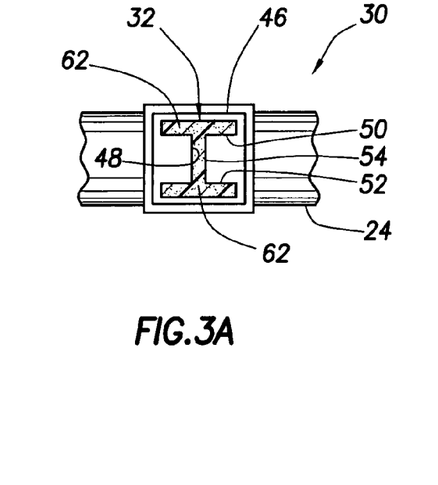
FIGS. 3A & B are cross-sectional views of alternative configurations of the beam, taken along line 3-3 of FIG. 2.

Referring additionally now to FIGS. 3A & B, alternative configurations of a cross-section of the body 32 are representatively illustrated, the cross-section taken along line 3-3 of FIG. 2. In the alternative depicted in FIG. 3A, the body 32 has a generally I-shaped cross-section, with an upper generally horizontal flange 50, a lower generally horizontal flange 52, and a generally vertical web 54 extending between the flanges. In the alternative depicted in FIG. 3B, the body 32 has a generally H-shaped cross-section, with laterally spaced apart generally vertical side flanges 56, 58, and a generally horizontal web 60 extending between the flanges.

Note that in the alternative depicted in FIG. 3A, the I-shaped cross-section of the body 32 has a generally uniform distribution of fibers 62 therein. That is, the flanges 50, 52 and web 54 have approximately the same density of the fibers 62 throughout the cross-section of the body 32. However, this uniform distribution of the fibers 62 is not necessary, as is described further below. In addition, it is important to note that the principles of the invention are not limited to use of composite materials having fibers distributed therein.

Figure 3B:
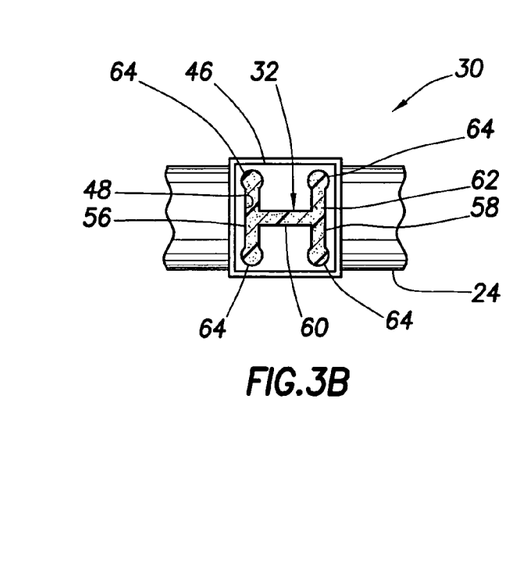

In the alternative depicted in FIG. 3B, the H-shaped cross-section of the body 32 has a nonuniform distribution of the fibers 62 therein. In particular, upper and lower end portions 64 of the flanges 56, 58 are enlarged relative to the remainder of the flanges and have a greater density of the fibers 62 as compared to the web 60 and to the remainder of the flanges between the end portions.

It is contemplated that the greater quantity of the fibers 62 in the flange end portions 64 will increase the flexural strength of the body 32, without significantly increasing its weight. However, other distributions of the fibers 62 may be used without departing from the principles of the invention.

Furthermore, the alternative I-shaped cross-section of the body 32 depicted in FIG. 3A may utilize a nonuniform distribution of the fibers 62 in keeping with the principles of the invention. For example, the upper and lower flanges 50, 52 may have a greater density of the fibers 62 therein as compared to the density of the fibers in the web 54.

Figures 4, 5:
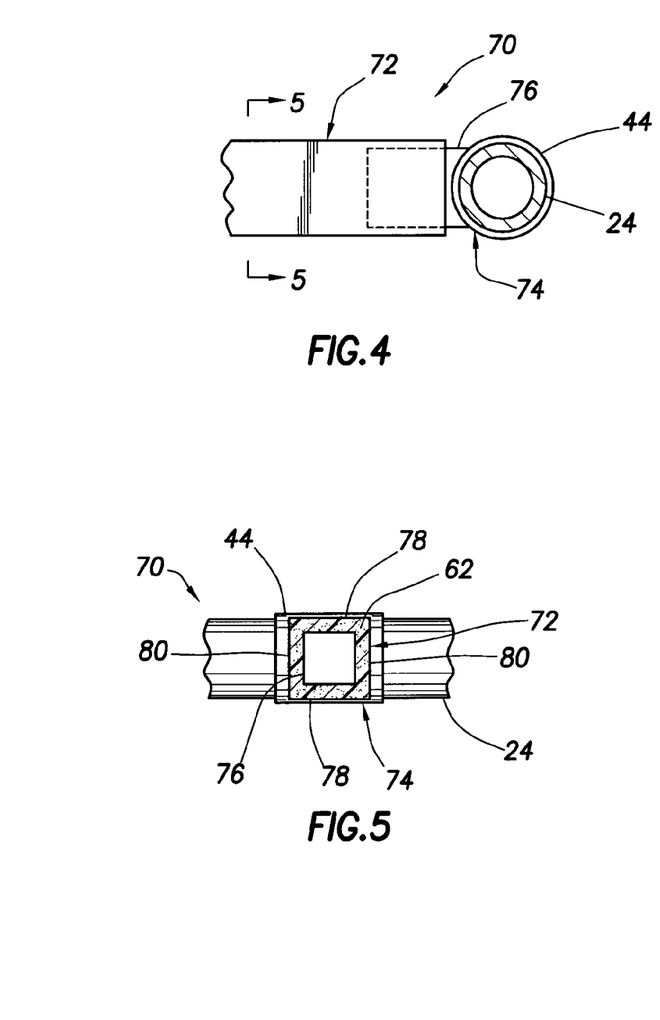
FIG. 4 is a partial side elevational view of another beam embodying principles of the present invention.
FIG. 5 is a cross-sectional view of the beam of FIG. 4, taken along line 5-5 of FIG. 4.

Referring additionally now to FIG. 4, another beam 70 embodying principles of the invention is representatively illustrated. The beam 70 may be used in place of the beam 18 in the suspension system 10, or it may be used in other suspension systems. The beam 70 is very similar to the beam 30 described above, but it differs in at least two substantial respects—a body 72 of the beam extending between its end connections 74 has a generally tubular shape, and a body coupling structure 76 of the end connections is received internally in the body.

The body 72 is preferably made of a composite material. The end connections 74 are preferably each made of metal, and may be integrally formed, or formed from multiple individual components. The body 72 may be bonded to the end connections 74, or attached using fasteners, etc.

Although not shown in FIG. 4, the other end connection 74 (used to pivotably attach the beam 70 to the frame 16) also includes the body coupling structure 76, instead of the body coupling structure 40 described above. However, it is not necessary for each end connection of a beam to have the same body coupling structure in keeping with the principles of the invention.

In FIG. 5 is depicted a cross-sectional view of the beam 70 taken along line 5-5 of FIG. 4. In this view it may be seen that the body 72 has a generally square-shaped tubular configuration with generally horizontal upper and lower walls 78 and generally vertical side walls 80. However, it should be understood that other tubular shapes, such as circular, triangular, etc., may be used in keeping with the principles of the invention.

The upper and lower walls 78 preferably have a greater density of the fibers 62 therein as compared to the side walls 80. As described above, this imparts greater flexural strength to the body 72. However, the fibers 62 may be otherwise distributed (for example, uniformly), or the body 72 may not contain the fibers, in keeping with the principles of the invention. If the body 72 has a cross-sectional shape other than square (such as circular), then upper and lower wall portions of the body may still have a greater density of the fibers 62 therein as compared to central wall portions therebetween.

Figure 6:
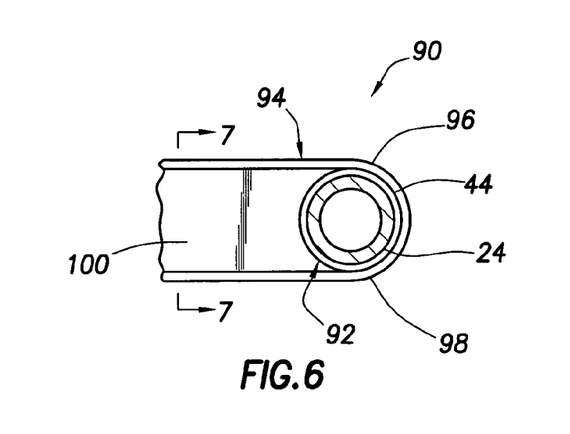
FIG. 6 is a partial side elevational view of another beam embodying principles of the present invention.

Referring additionally now to FIG. 6, another beam 90 embodying principles of the invention is representatively illustrated. The beam 90 may be used in place of the beam 18 in the suspension system 10, or it may be used in other suspension systems.

The beam 90 differs significantly from the other beams 30, 70 described above in that end connections 92 at opposite ends of a body 94 of the beam 90 do not include a metal body coupling structure. Instead, upper and lower flanges 96, 98 of the generally I-shaped cross-section body 94 wrap outwardly about the axle coupling structure 44, as depicted in FIG. 6. At an opposite end (not shown) of the beam 90, the upper and lower flanges 96, 98 wrap outwardly about the frame coupling structure 38.

The body 94 is preferably made of a composite material, and the end connections 92 are preferably made of metal. However, other materials may be used in keeping with the principles of the invention.

By at least partially encircling the axle coupling structure 44, the structure is rigidly attached to the body 94. The structure 44 may be rigidly attached to the axle 24, or it may be pivotably attached, as described above. Note that a web 100 of the body 94 extending between the flanges 96, 98 may also be attached to the structure 44. The flanges 96, 98 and web 100 may be attached to the structure 44 by any method, such as bonding, using fasteners, etc.

Figure 7:
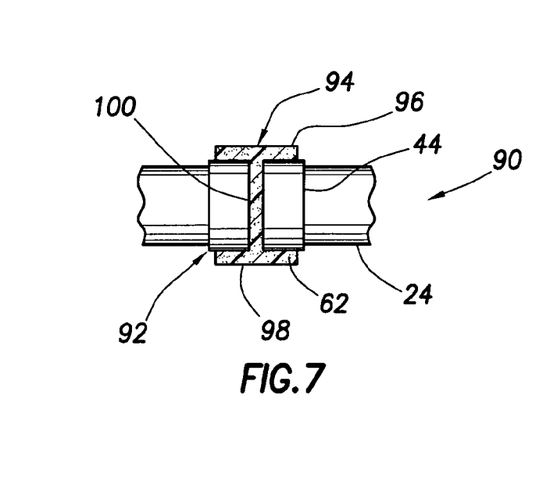
FIG. 7 is a cross-sectional view of the beam of FIG. 6, taken along line 7-7 of FIG. 6.

In FIG. 7 a cross-section of the beam 90 is illustrated, taken along line 7-7 of FIG. 6. In this view it may be seen that the upper and lower flanges 96, 98 have a greater density of the fibers 62 therein as compared to the web 100. However, the fibers 62 may be otherwise distributed (for example, uniformly), or the body 94 may not contain the fibers, in keeping with the principles of the invention.

Figure 8:
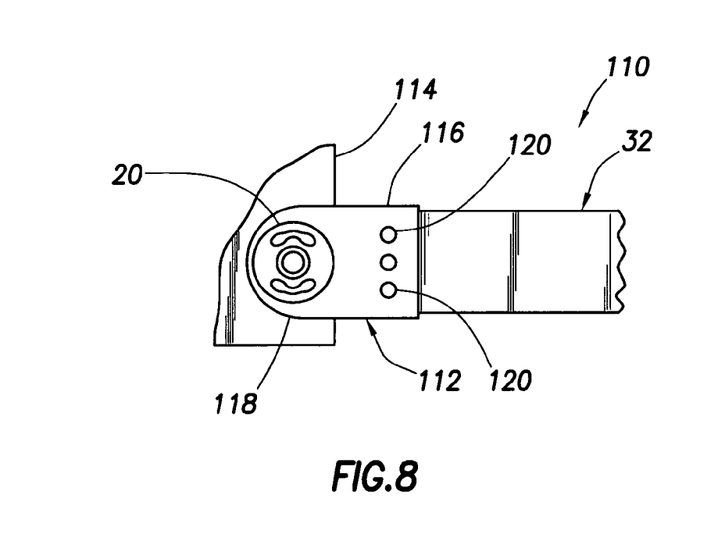
FIG. 8 is a partial side elevational view of another beam embodying principles of the present invention.
Figure 9:
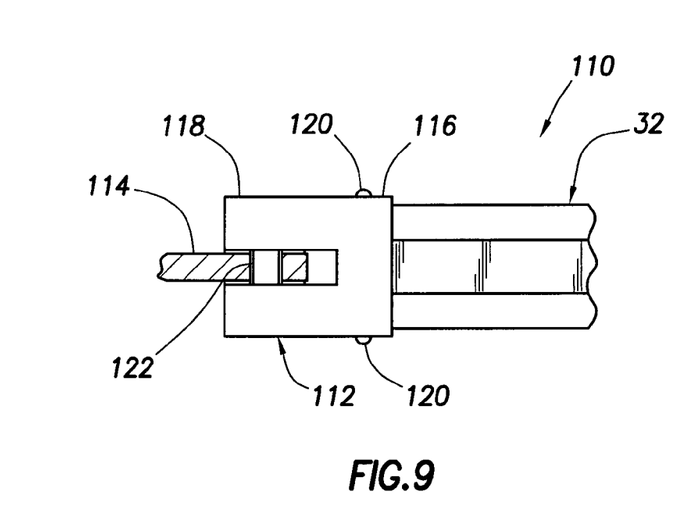
FIG. 9 is a top view of the beam of FIG. 8.

Referring additionally now to FIGS. 8 & 9, another beam 110 embodying principles of the invention is representatively illustrated. The beam 110 may be used in place of the beam 18 in the suspension system 10, or it may be used in other suspension systems.

The beam 110 is very similar to the beam 30 described above, in that it includes the body 32 having the alternative H-shaped cross-section as depicted in FIG. 3B. However, the beam 110 includes a different end connection 112 for pivotably connecting the beam to a hanger bracket 114.

The end connection 112 includes a body coupling structure 116 and a frame coupling structure 118. Preferably, the structures 116, 118 are integrally formed of metal. However, the structures 116, 118 could be made up of multiple elements, and could be made of different materials, without departing from the principles of the invention.

The body coupling structure 116 has a cavity (not visible in FIGS. 8 & 9, but similar to the cavity 48 described above) formed therein for internally receiving the body 32. Fasteners 120 are used to secure the body 32 to the structure 116. Instead of, or in addition to, the fasteners 120, the body 32 may be bonded to the structure 116, if desired.

The frame coupling structure 118 straddles the hanger bracket 114 and is pivotably attached thereto. A pin 122 extends through the hanger bracket 114 between bushings 20 in the portions of the structure 118 on each lateral side of the hanger bracket. In this manner, the hanger bracket 114 does not need to straddle the end connection 112, and so the hanger bracket may be made lighter and less expensive than prior designs in which the hanger bracket straddles the end connection.

Note that, by separately forming the bodies from the end connections in the beams 30, 70, 90, 110 described above, changes in beam lengths to suit different applications may be made by merely changing the length of the bodies. Using prior methods, entire axle and beam assemblies had to be inventoried, and any change in any component therein required construction of another entire assembly. Using the principles of the present invention, in situations where multiple beam lengths are required, a suspension system manufacturer would merely need to inventory the end connections and the appropriate lengths of bodies to produce different beam lengths. That is, the end connections and axle may remain the same, only the bodies of the beams would need to be varied.

Figure 10:
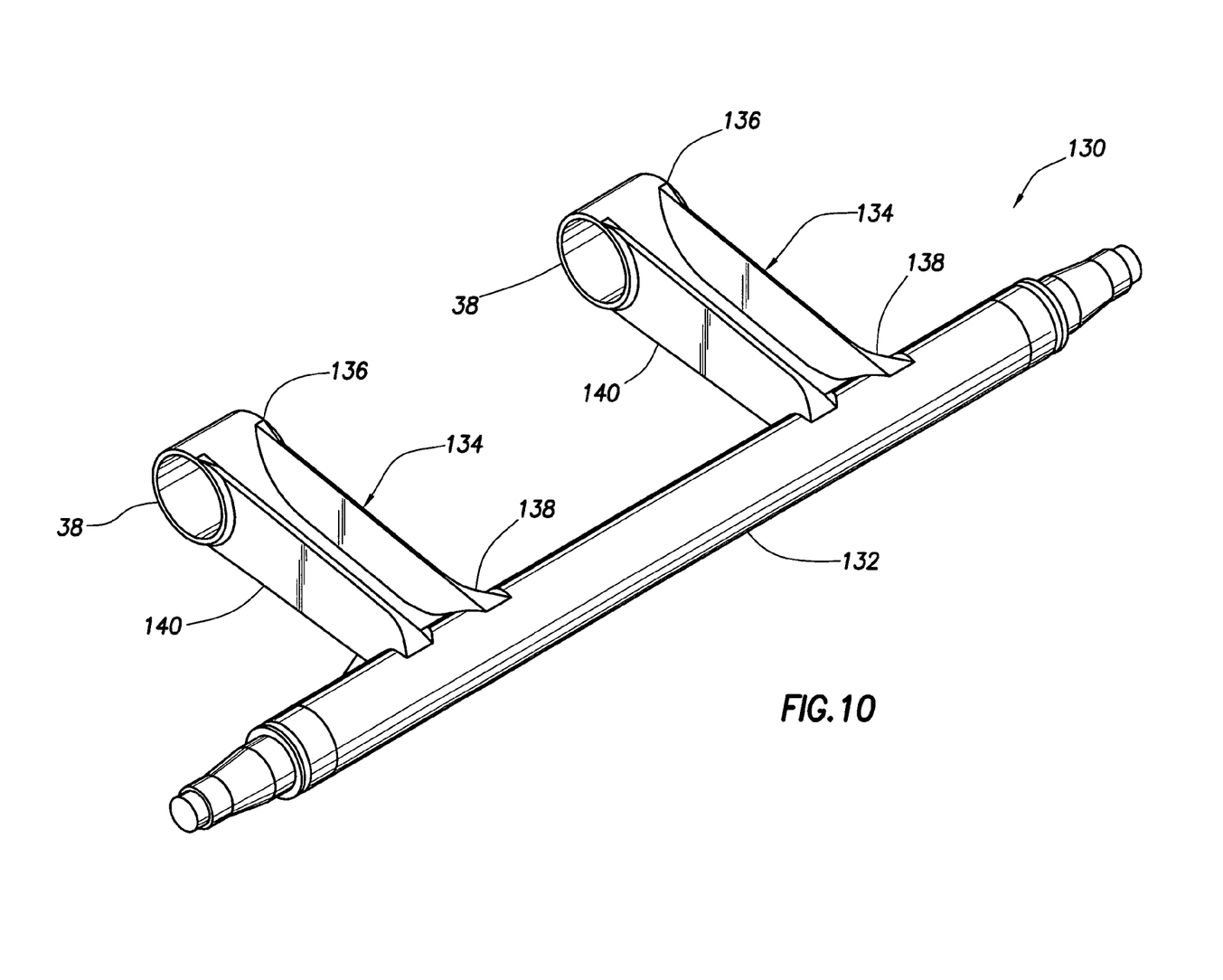
FIG. 10 is a perspective view of a suspension system embodying principles of the present invention.

Referring additionally now to FIG. 10, a beam and axle assembly 130 embodying principles of the invention is representatively illustrated. The assembly 130 may be used in place of the axle 24 and beams 18 in the suspension system 10, or it may be used in other suspension systems.

The assembly 130 includes a generally tubular axle 132 and two beams 134 rigidly attached to the axle. The beams 134 have a generally H-shaped cross-section, similar to the cross-section depicted in FIG. 3B. At opposite ends of each of the beams 134 are a frame end connection 136 and an axle end connection 138. A body 140 of each beam 134 extends between the frame end connection 136 and the axle end connection 138.

Preferably, the bodies 140 are made of a composite material. The axle 132 may be made of metal, or the axle may be made of a composite material, or another material. If the axle 132 is made of a composite material, the axle composite material may be the same as, or different from, the composite material from which the bodies 140 are made.

In this embodiment, the flanges and/or web of the body 140 are attached directly to the axle 132 at the axle end connection 138, for example, by bonding, using fasteners, etc. Preferably, the flanges extend at least partially about the axle 132, and may be wrapped outwardly about the axle, if desired. The flanges may have upper and lower end portions with a greater density of fiber than the web, as in the body 32 described above.

The flanges and/or web of the body 140 are also attached directly to the frame coupling structure 38 at the frame end connection 136, for example, by bonding, using fasteners, etc. Preferably, the flanges extend at least partially about the structure 38, and may be wrapped outwardly about the structure, if desired. In this embodiment, the structure 38 may be made of a composite material, metal or another material.

Figure 11:
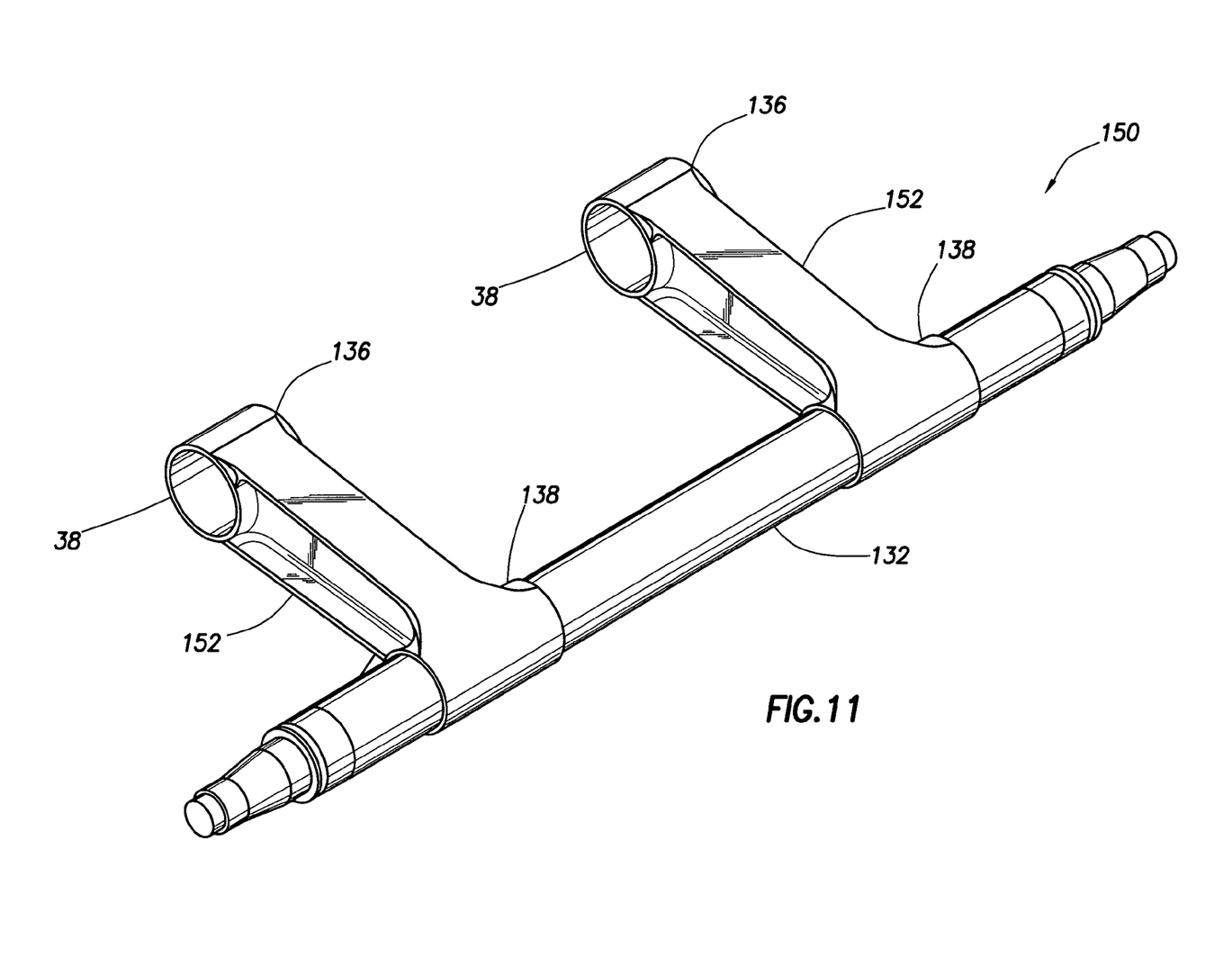
FIG. 11 is a perspective view of another suspension system embodying principles of the present invention.

Referring additionally now to FIG. 11, another beam and axle assembly 150 embodying principles of the invention is representatively illustrated. The assembly 150 is very similar to the assembly 130 described above, but instead of lo the bodies 140 having a generally H-shaped cross-section, the assembly 150 includes bodies 152 each of which has a generally I-shaped cross-section, similar to the cross-sections depicted in FIGS. 3A & 7. As with the beam bodies 32, 94 shown in these figures, upper and lower flanges of the bodies 152 of FIG. 11 may have a greater density of fiber therein as compared to the webs of the bodies.

Preferably, the bodies 152 are made of a composite material. The axle 132 may be made of metal, or the axle may be made of a composite material, or another material. If the axle 132 is made of a composite material, the axle composite material may be the same as, or different from, the composite material from which the bodies 152 are made.

The flanges and/or web of each body 152 are attached directly to the axle 132 at the axle end connection 138, for example, by bonding, using fasteners, etc. Preferably, the flanges extend at least partially about the axle 132, and may be wrapped outwardly about the axle, if desired. The flanges and/or web of each body 152 are also attached directly to the frame coupling structure 38 at the frame end connection 136, for example, by bonding, using fasteners, etc. Preferably, the flanges extend at least partially about the structure 38, and may be wrapped outwardly about the structure, if desired. The structure 38 may be made of a composite material, metal, or another material.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A suspension system for a vehicle having a frame, the suspension system comprising:
an axle; and
a beam interconnected between the vehicle frame and the axle, the beam having opposite ends, an elongated body extending between the opposite ends, and a metal end connection at one of the opposite ends, the body being made of a composite material, and the body having a generally I-shaped cross-section.

2. The suspension system according to claim 1, wherein the end connection is a frame pivot connection.

3. The suspension system according to claim 1, wherein the end connection is an axle connection.

4. The suspension system according to claim 3, wherein the axle is made of an axle composite material.

5. The suspension system according to claim 1, wherein the end connection has a cavity formed therein, the body being received in the cavity.

6. The suspension system according to claim 1, wherein the end connection is received internally in the body.

7. The suspension system according to claim 1, wherein the body has a nonuniform distribution of fibers in the composite material.

8. The suspension system according to claim 1, wherein flanges of the I-shaped cross-section have a greater density of fiber than a web of the cross-section extending between the flanges.

9. The suspension system according to claim 1, wherein the body has a generally tubular cross-section.

10. The suspension system according to claim 9, wherein upper and lower wall portions of the tubular cross-section have a greater density of fiber than central wall portions of the cross-section.

11. The suspension system according to claim 1, wherein the end connection includes a sleeve attached to a body coupling structure.

12. The suspension system according to claim 11, wherein the structure receives the body internally therein.

13. The suspension system according to claim 11, wherein the body receives the structure internally therein.

14. The suspension system according to claim 11, wherein the sleeve and body coupling structure are integrally formed.

15. The suspension system according to claim 11, wherein the sleeve encircles a pivot bushing.

16. The suspension system according to claim 15, wherein the pivot bushing pivotably connects the end connection to the vehicle frame.

17. The suspension system according to claim 15, wherein the pivot bushing pivotably connects the end connection to the axle.

18. The suspension system according to claim 11, wherein the sleeve extends at least partially about the axle.

19. The suspension system according to claim 1, wherein the end connection includes an axle coupling structure attached to the axle, and a body coupling structure attached to the body.

20. The suspension system according to claim 19, wherein the body coupling structure receives the body internally therein.

21. The suspension system according to claim 19, wherein the body receives the body coupling structure internally therein.

22. The suspension system according to claim 19, wherein the axle coupling structure and the body coupling structure are integrally formed.

23. The suspension system according to claim 19, wherein the axle coupling structure extends at least partially about the axle.

24. The suspension system according to claim 19, wherein the axle coupling structure is pivotably attached to the axle.

25. The suspension system according to claim 19, wherein the axle is made of a composite material.

26. A suspension system for a vehicle having a frame, the suspension system comprising:
an axle; and
a beam interconnected between the vehicle frame and the axle, the beam having opposite ends, an elongated body extending between the opposite ends, an axle end connection at one of the opposite ends, and a frame end connection at the other of the opposite ends, the body being made of a composite material and having a cross-section with at least two flanges and a generally vertical web extending between the flanges.

27. The suspension system according to claim 26, wherein the flanges wrap outwardly about the axle end connection.

28. The suspension system according to claim 26, wherein the flanges are attached to an axle coupling structure of the axle end connection.

29. The suspension system according to claim 28, wherein the structure is rigidly attached to the axle.

30. The suspension system according to claim 28, wherein the structure is pivotably attached to the axle.

31. The suspension system according to claim 28, wherein the structure extends at least partially about the axle.

32. The suspension system according to claim 28, wherein the structure is welded to the axle.

33. The suspension system according to claim 28, wherein the axle is made of an axle composite material.

34. The suspension system according to claim 26, wherein the flanges are attached directly to the axle.

35. The suspension system according to claim 34, wherein the web is attached directly to the axle.

36. The suspension system according to claim 34, wherein the flanges extend at least partially about the axle.

37. The suspension system according to claim 34, wherein the axle is made of an axle composite material.

38. The suspension system according to claim 26, wherein the flanges wrap outwardly about the frame end connection.

39. The suspension system according to claim 38, wherein the flanges are attached to a frame coupling structure of the frame end connection.

40. The suspension system according to claim 39, wherein the frame coupling structure extends about a pivot bushing.

41. The suspension system according to claim 26, wherein the flanges have a greater density of fiber than the web.

42. The suspension system according to claim 26, wherein upper and lower end portions of the flanges have a greater density of fiber than the web.

43. The suspension system according to claim 26, wherein the body cross-section is generally I-shaped.

44. The suspension system according to claim 26, wherein the frame end connection includes a structure which straddles a hanger bracket attached to the vehicle frame.

45. The suspension system according to claim 26, wherein at least one of the axle and frame end connections is made of metal.

46. The suspension system according to claim 26, wherein each of the axle and frame end connections is made of metal.

47. The suspension system according to claim 26, wherein at least one of the axle and frame end connections has a cavity formed therein, the body being received in the cavity.

48. The suspension system according to claim 26, wherein the body has a nonuniform distribution of fiber therein.

49. The suspension system according to claim 26, wherein the axle is made of a composite material.

\* \* \* \* \*

UNITED STATES PATENT AND TRADEMARK OFFICE
CERTIFICATE OF CORRECTION

| | | |
|---|---|---|
| PATENT NO. | : 7,914,026 B2 | Page 1 of 1 |
| APPLICATION NO. | : 10/600051 | |
| DATED | : March 29, 2011 | |
| INVENTOR(S) | : Thomas N. Chalin et al. | |

It is certified that error appears in the above-identified patent and that said Letters Patent is hereby corrected as shown below:

Title page, Item 73, Assignee:, cancel "Chain" and insert in place thereof -- Chalin --.

Signed and Sealed this
Twenty-sixth Day of July, 2011

David J. Kappos
*Director of the United States Patent and Trademark Office*